(12) United States Patent
Medvinsky et al.

(10) Patent No.: US 11,626,975 B2
(45) Date of Patent: Apr. 11, 2023

(54) SECURE ONLINE ISSUANCE OF CUSTOMER-SPECIFIC CERTIFICATES WITH OFFLINE KEY GENERATION

(71) Applicant: ARRIS Enterprises LLC, Suwanee, GA (US)

(72) Inventors: Alexander Medvinsky, San Diego, CA (US); Tat Keung Chan, San Diego, CA (US); Xin Qiu, San Diego, CA (US); Jason A. Pasion, San Diego, CA (US); Ting Yao, San Diego, CA (US); Shanthakumar Ramakrishnan, Westford, MA (US)

(73) Assignee: ARRIS Enterprises LLC, Suwanee, GA (US)

( * ) Notice: Subject to any disclaimer, the term of this patent is extended or adjusted under 35 U.S.C. 154(b) by 267 days.

(21) Appl. No.: 17/150,470

(22) Filed: Jan. 15, 2021

(65) Prior Publication Data

US 2021/0306161 A1    Sep. 30, 2021

Related U.S. Application Data

(60) Provisional application No. 62/994,996, filed on Mar. 26, 2020.

(51) Int. Cl.
*H04L 29/06* (2006.01)
*H04L 9/08* (2006.01)
(Continued)

(52) U.S. Cl.
CPC ............ *H04L 9/0822* (2013.01); *E02B 3/106* (2013.01); *E02B 3/122* (2013.01); *H04L 9/3247* (2013.01); *H04L 9/3268* (2013.01)

(58) Field of Classification Search
CPC ....... E02B 3/122; E02B 3/106; H04L 9/0822; H04L 9/3247; H04L 9/3268
See application file for complete search history.

(56) References Cited

U.S. PATENT DOCUMENTS

| 9,130,928 | B2 * | 9/2015 | Qiu ........................ H04L 63/06 |
| 2011/0047374 | A1 * | 2/2011 | Liu ........................ H04L 9/3265 380/277 |

(Continued)

FOREIGN PATENT DOCUMENTS

| KR | 20170094276 A | * | 10/2007 |
| KR | 20070099863 A | * | 8/2017 |

OTHER PUBLICATIONS

International Search Report and Written Opinion Re: Application No. PCT/US2021/023253 (dated Jun. 22, 2021).

*Primary Examiner* — Sher A Khan
(74) *Attorney, Agent, or Firm* — Chernoff, Vilhauer, McClung & Stenzel, LLP (57) ABSTRACT

In a system comprising an customer providing a service to a plurality of client devices, a method and system for providing an customer-specific digital certificate to a client device of the plurality of client devices is disclosed. The method comprises receiving, in an intermediate certificate authority, a pre-generated digital certificate and an encrypted client device private key encrypted according to a private key encryption key PrKEK, receiving, from the client device, a request for the customer-specific digital certificate, the request comprising at least one of client device identifying information and information identifying the customer, the request signed according to a pre-provisioned client device digital certificate, and transmitting the customer-specific digital certificate and the encrypted client device private key to the client device.

17 Claims, 3 Drawing Sheets

(51) Int. Cl.
*E02B 3/12* (2006.01)
*H04L 9/32* (2006.01)
*E02B 3/10* (2006.01)

(56) References Cited

U.S. PATENT DOCUMENTS

| | | | |
|---|---|---|---|
| 2011/0197061 A1* | 8/2011 | Chou | H04L 9/3265 |
| | | | 713/156 |
| 2011/0258434 A1 | 10/2011 | Qiu et al. | |
| 2012/0066044 A1* | 3/2012 | Honnef | G06Q 30/0601 |
| | | | 705/26.1 |
| 2013/0318354 A1* | 11/2013 | Entschew | H04L 9/3247 |
| | | | 713/175 |
| 2014/0325047 A1* | 10/2014 | Kruglick | H04L 41/5041 |
| | | | 709/223 |
| 2016/0065567 A1* | 3/2016 | Aggarwal | H04L 63/062 |
| | | | 713/175 |
| 2018/0219678 A1* | 8/2018 | Medvinsky | H04L 9/3247 |

* cited by examiner

SECURE ONLINE ISSUANCE OF CUSTOMER-SPECIFIC CERTIFICATES WITH OFFLINE KEY GENERATION

CROSS-REFERENCE TO RELATED APPLICATIONS

This application claims benefit of U.S. Provisional Patent Application No. 62/994,996, entitled "SECURE ONLINE ISSUANCE OF CUSTOMER-SPECIFIC CERTIFICATES WITH OFFLINE KEY GENERATION," by Alexander Medvinsky, Tat Chan, Xin Qui, Jason Pasion, Ting Yao, Shanthakumar Ramakrishnan, filed Mar. 26, 2020, which application is hereby incorporated by reference herein.

This application is related to the following co-pending and commonly assigned patent application(s), all of which applications are incorporated by reference herein:

Application Ser. No. 15/885,107, entitled "ORIGIN CERTIFICATE BASED ON-LINE CERTIFICATE ISSUANCE," filed on Jan. 31, 2018, by Alexander Medvinsky, Eric J. Sprunk, Xin Qiu, and Paul Moroney, which application claims benefit of U.S. Provisional Application No. 62/452,750, entitled "ORIGIN CERTIFICATE BASED ONLINE CERTIFICATE ISSUANCE," filed on Jan. 31, 2017, by Alexander Medvinsky, Eric J. Sprunk, Xin Qiu, and Paul Moroney.

BACKGROUND

1. Field

The present invention relates to systems and methods for secure communication, and in particular to a system and method for rapidly issuing digital certificates.

2. Description of the Related Art

A Certificate Authority (CA) is expected to comprise a very secure system. Device manufacturers and service providers depend on CAs to never lose control of secure parameters such as device private keys and the CA private key used to sign device certificates. At the same time, there are a multitude of threats and possible network-based attacks on any online system. Hence, it is normally preferred to keep a CA in a secure offline facility.

However, some certificate profiles and requirements may necessitate an online CA. For example, sometimes it is required to include device characteristics inside a certificate. Such characteristics may include device serial number(s) and identifier(s), device model, software version, hardware version, etc., and it is not always possible for a CA to know such information about a device in advance of the device certificate request. Instead, it is sometimes necessary for the information to be provided at the time of a certificate request, and online.

In another example, certificate lifetime may be very short, e.g., only a few months. Certificates with such short lifetimes may be issued to devices which are not very secure and thus not trusted with the longer-lived certificates. In other cases, short certificate lifetimes are associated with a short subscription period such as 1-hour or 1-day subscription for a public Wi-Fi hotspot. In such cases, certificates that had been issued in batches ahead of being requested may sit on a key server for weeks or even months before they are requested and may be close to their expiration at the time they are needed. To avoid supplying devices certificates that are nearly expired, it is best to issue them online at the time that a certificate is being requested.

Hence, there is a need for a system and method that provides online access to digital certificates upon request and with minimal delay. U.S. Patent Application No. 20180219678, published Aug. 2, 2018 discloses a system and method wherein device key pairs and certificates are generated in a secure offline facility and then new certificates are to be re-issued in the factory with additional information that was not available during the initial offline generation. In this system and method, for each certificate type, there is one template that is utilized to determine how the new certificate should be issued—based on both the original certificate and some new information available in the factory.

There are situations, however, wherein during offline pre-generation of key pairs and certificates, the target customer is unknown and where each target customer has their own certificate template that includes a separate customer-specific Sub-CA. What is needed is a system and method that provides for the generation and provision of certificates in such circumstances.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

To address the requirements described above, this document discloses a system and method for providing a customer-specific digital certificate to one or more client devices is disclosed. Such customers may include IoT service providers, cloud service providers, wireless network operators, or other entities. The method comprises receiving, in an on-line certificate authority, a pre-generated digital certificate and an encrypted client device private key encrypted according to a private key encryption key PrKEK, receiving, from the client device, a request for the customer-specific digital certificate, the request comprising at least one of client device identifying information and information identifying the customer, the request signed according to a pre-provisioned client device digital certificate, and transmitting the customer-specific digital certificate and the encrypted client device private key to the client device. Another embodiment is evidenced by an apparatus having a processor and a communicatively coupled memory storing processor instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

An Offline Certificate Authority (OFFCA) is used to generate client public/private key pairs, encrypt the private keys and issue the corresponding digital certificates. This information is transferred to an online CA (ONCA) which incorporates multiple customer-specific issuing CAs and does not possess the means to decrypt or modify the device private keys. However, the ONCA (at the time of receiving a certificate request) can extract the public key and other relevant information from an pre-generated device certificate generated offline and sign a new device certificate (Final Certificate) which includes information from the request. In this context, the signing of a data refers to a digital signature scheme in which a message or data is "signed" with a signature produced from the data and a private key of a private/public key pair associated with a customer-specific Certificate Authority. The customer-specific CA private key is selected based on customer-identifying information in the certificate request message. The response message from the ONCA is then transmitted with the new customer-specific certificate, corresponding encrypted device private key, plus ONCA's message signing certificate chain and a message signature. The recipient of the message can then verify the authenticity of the message (that it came from the sender of the message) using the message, the included certificate chain, and the signature.

This solution allows for flexibility offered only by an ONCA and can generate device certificates with device information which is only available at the time of a certificate request. It also improves security of the system by limiting the functions that the ONCA needs to perform. Since the ONCA is not able to generate, replace or access device private keys and is also limited as to what information it can generate and add into device certificates, none of the device private keys will be exposed, even if the ONCA is compromised.

The ONCA obtains encrypted device private keys and origin certificates from the offline CA and therefore cannot generate more device private keys and origin certificates than what has been already provided by the OFFCA. Once a security compromise of the ONCA becomes known, the ONCA no longer receives new encrypted device private keys and origin certificates, limiting how many individual device certificates would later need to be revoked and replaced. Furthermore, the OFFCA incorporates hardware-based high-quality random number generation to ensure that public/private keypairs are unique with a high level of entropy, as opposed to keypair generation by client devices which may have limited CPU resources and low level of entropy that could result in duplicate keypairs.

Further, after a device is already installed at a customer location, it provides a customer name or ID in a certificate request and one of the offline pre-generated certificates is utilized along with the customer information to find a correct customer-specific template and to issue a customer-specific certificate from a customer-specific CA.

Pre-Generation of Cryptographic Assets

Figure 1:
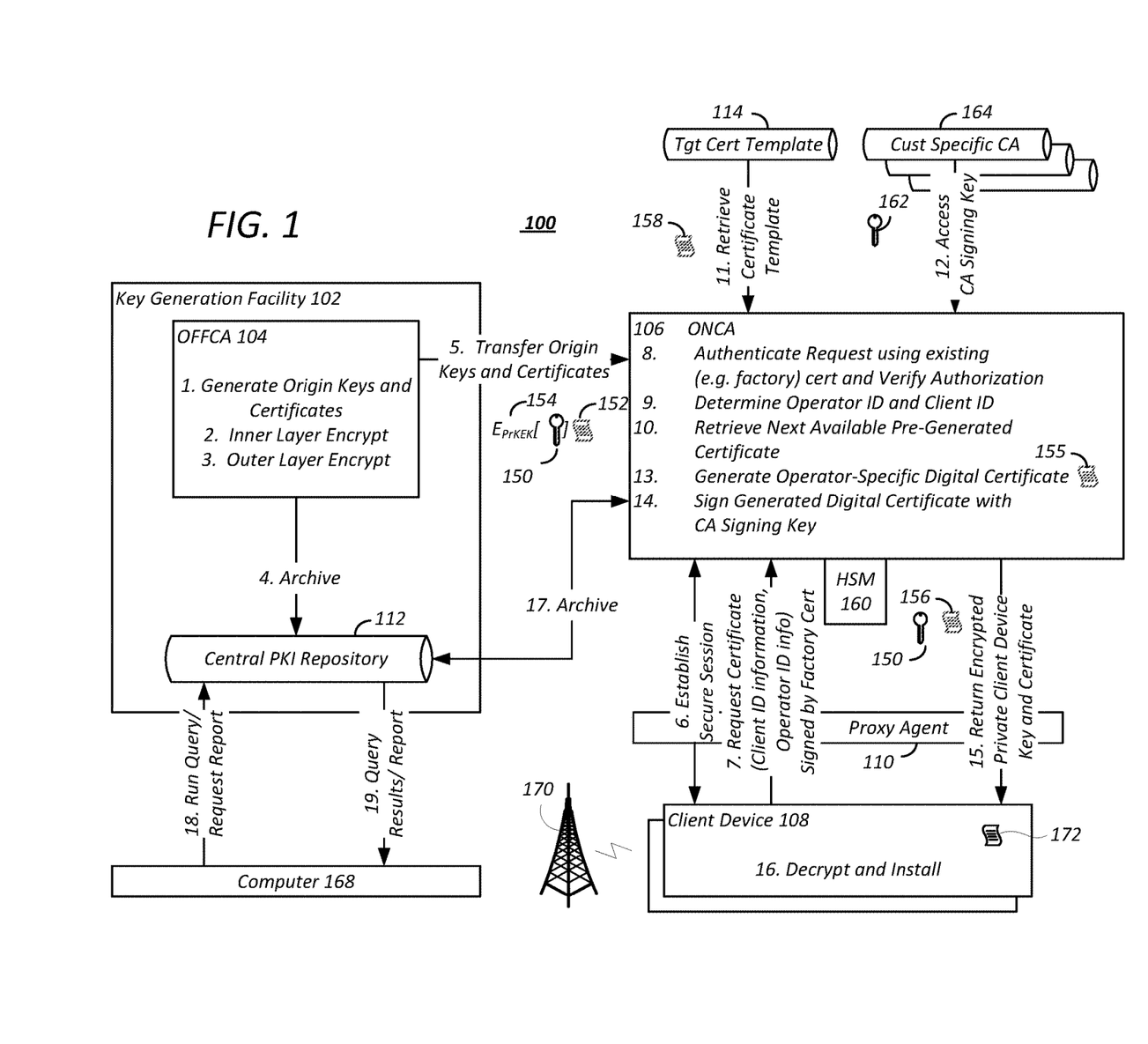
FIG. 1 is a diagram illustrating one embodiment of certificate issuing system.

FIG. 1 is a diagram illustrating one embodiment of certificate issuing system (CIS) 100. The CIS 100 comprises a key generation facility 102 having the OFFCA 104 and the ONCA 106. In one embodiment, the operation of the CIS 100 is described as follows in accordance with the numbered operations shown in FIG. 1.

In the first process, the OFFCA 104 generates device private keys 150, the corresponding public keys, and the origin certificates (which contain the client device 108 public keys). As the origin certificates 152 are pre-generated (e.g. generated before they are requested by the client devices 108), they are alternately referred to hereinafter as pre-generated certificates 152. The type of the device private key and device public key in the certificate may be Rivest-Shamir-Adleman (RSA), Elliptic Curve, ElGamal, digital signature algorithm (DSA) or any other type of public/private key pair.

In the second process, the OFFCA 104 encrypts the device private keys 150. In one embodiment, each device private key 150 is separately encrypted using a key that is not accessible to the ONCA 106. For example, the encryption key used to encrypt each of the private keys may be a Private Key Encryption Key (PrKEK) that is global, applicable to all client devices 108 for a particular customer, applicable to all client devices 108 for all customers, unique per client device 108 model or may even be a unique value that has been separately pre-provisioned into each target client device 108 or chip within the target client device 108. PrKEK may be a symmetric encryption key such as AES or 3DES, or it may be a public key of type RSA or ElGamal such that client devices utilizing a matching PrKEK-Private private key to decrypt their private keys.

Importantly, PrKEK (or the corresponding PrKEK-Private) is not available to the ONCA 106, and the ONCA 106 does not need to decrypt or make any further modifications to the device private keys 150 received from the OFFCA 104. In one embodiment, PrKEK (or PrKEK-Private) is available only to the target client devices 108. In other embodiments having a proxy agent 110 (described further below interposed between the ONCA 106 and the target client devices 108), PrKEK may be available to the proxy agent 110, which provides an indirect network connection between the ONCA 106 and client devices 108. The proxy agent 110 is more fully discussed below.

In one embodiment, an optional second layer of encryption is imposed wherein the device private keys 150 are further encrypted (e.g. double encrypted) using an encryption key that is specific to a particular ONCA 106 instance or server. Hereinafter, that optional encryption key is referred to as an Outer Layer Encryption Key (OLEK). This further encryption of the device private keys 150 according to the OLEK is illustrated in FIG. 1 process three.

In operation four, the OFFCA 104 optionally makes copies of the origin digital certificates and encrypted private keys and archives them in a data repository, for example, in the illustrated central PKI repository 112. This archived information can be used to generate reports at a later time or for re-provisioning the device private key and origin certificates to client devices 108 that lose their private key and/or certificate, for example, because of corruption of a memory of the client device 108 itself. This permits the same device PKI to be re-provisioned into such devices.

Regulations or customer requirements may prohibit the saving of device private keys 150 in the data repository, or limit the period for which such device private keys 150 may be saved or archived (after which, they must be erased), even when the device private keys 150 are in encrypted form. In such embodiments, the device private keys 150 are not archived as described in operation four. However, even in such cases, the origin digital certificates 152 may be archived, as there are typically no prohibitions to saving or retaining the origin digital certificates 152.

Provision of Pre-Generated Cryptographic Assets to the Intermediate Certificate Authority In operation five, the pre-generated (in operation one) and encrypted 154 device private keys 150 and origin (pre-generated) certificates 152 are delivered from the key generation facility 102 to the ONCA 106. Since OFFCA 104 is offline, a manual transfer step may be involved such as a transfer of the generated keys and certificates to an online computer via removable media. These pre-generated encrypted private keys 150 and origin digital certificates 152 are later retrieved and utilized by the ONCA 106 in responding to certificate requests from the client devices 108.

Optionally, the interface used to transfer this information from an online computer is authenticated and encrypted, e.g., using TLS or SSL, or an IPsec-based VPN to ensure that all PKI assets transferred to an ONCA 106 came from a legitimate source and to avoid denial of service attacks.

In operation six, the client device 108 and ONCA 106 establish a secure (encrypted and authenticated) session—for example using 2-way authenticated TLS protocol. This operation is optional since it is possible to encrypt/authenticate each transaction separately (as described below), without using a separately pre-established secure session between the client device 108 and the ONCA 106. Also, a secure session may instead be established between the ONCA 106 and the proxy agent 110 referred to above. In that case, the process of establishing a secure session could occur earlier, any time prior to one of the client devices 108 submitting a request to the ONCA 106 for an identity (operation seven below) via the proxy agent 110.

Requesting a Customer-Specific Cryptographic Asset

In process seven, the client device 108 requests customer-specific digital certificate 156 and a client device private key 150. This request includes at least one of client device identifying information (e.g. MAC address, client ID, serial number, or client device model information) and information identifying the customer (e.g. customer ID) for which the customer-specific device digital certificate 156 is desired. For example, the client device 108 may be a radio controller that desires a digital certificate for use with a particular one or group of a plurality of cellphone network operators 170 providing service to the client devices 108. This request may also include a device credentials profile ID (DCP-ID), which is an alphanumeric identifier associated with a specific set of device 108 credentials that may include an asymmetric device private key and a digital certificate unique to the device along with any number of additional unique and global device keys, digital certificates and identifiers. This optional information may be included in the customer-specific device digital certificate 156 that is generated by the ONCA 106 and returned to the client device 108.

The request for the digital certificate may be authenticated (e.g. digitally signed) by the requesting client device 108 using a pre-installed private key and digital certificate 172 that are already factory provisioned in the client device 108 before deployment. This pre-existing private key and digital certificate may be global or may be unique in a variety of ways (e.g. unique among all devices from all sources, unique among devices from a particular source or among devices of a particular class or model).

The request may be delivered directly to the ONCA 106 or it may be first delivered to the proxy agent 110. The proxy agent 110 may simply forward the request message as is to the ONCA 106.

Alternatively, the proxy agent 110 may verify the signature on the request message (if the message includes a signature) as well as check authorization of the requesting client device 108 for requesting certificates. If both checks pass, then the proxy agent 110 re-signs the same request with the signing key belonging to the proxy agent 110, and forwards the message to the ONCA 106.

In some embodiments, in addition to or instead of a secure session established during process six, this request message may include a Client Key Agreement Public Key (CKAPK). CKAPK may for example be a Diffie-Hellman (DH) or Elliptic Curve Diffie-Hellman (ECDH) public key and it will be utilized to protect the private key that is returned by ONCA 106 in a later step. CKAPK may be generated by either the client device 108 or by the proxy agent 110. CKAPK needs to be generated together with the corresponding Client Key Agreement Private Key CKAPrK, as they are paired keys.

In operation eight, ONCA 106, upon receiving the request, first authenticates the request by checking the signature of the request. It then validates the provided authorization by assuring that whichever entity signed the request (either proxy agent 110 or client device 108) is authorized to obtain the customer-specific digital certificate that is being requested. If the authentication of the request or validation of authorization fails, ONCA 106 returns an error code to the client device rather than a valid (and encrypted) device private key 150 and customer-specific device certificate 156.

In operation nine, the ONCA 106 determines the identity of the client device 108 and the identity of the customer 170 for which the customer-specific device digital certificate 156 is requested. With regard to identifying the client device, several different embodiments are envisioned. In one embodiment, the pre-provisioned client digital certificate 172 is a global digital certificate, and the client device identifying information and customer-identifying information is explicitly provided in the certificate request message, for example, client's MAC Address or IP Address, and is simply extracted for use. In another embodiment, the pre-provisioned client digital certificate 172 is unique to the client device 108 and the client device identifying information is determined from the pre-provisioned client device digital certificate 172. The customer is then optionally identified according to a comparison between the client device identifying information and a pre-determined mapping of the client device identifying information and the customer that is provided to and maintained by ONCA 106. For example, digital certificate may include a MAC address of the client device, and the customer can be identified according to a comparison between the MAC address of the client device and a whitelist of MAC addresses for each of the plurality of customers. Alternatively, customer identity is explicitly specified in the client device certificate or request message. In still another embodiment, the customer-specific digital certificate is a pre-generated digital certificate uniquely associated with the client device identifying information, and the pre-generated digital certificate is one of a batch of pre-generated digital certificates for a group of a plurality of client devices 108 of which the requesting client device 108 is a member, and the pre-generated digital certificate is provided to the ONCA 106 before receiving the request for the customer-specific device digital certificate 156.

Retrieving and Building a Customer-Specific Cryptographic Asset

In operation ten, ONCA 106 finds an available (not yet assigned to a client device 108) pre-generated certificate 152 and encrypted device private key 150 from its local repository. ONCA 106 later generates a new customer-specific device certificate 156 that is derived from the pre-generated certificate 152 while keeping the encrypted device private key 150 the same as the encrypted device private key 150, as described below.

In operation eleven, after identifying the requesting client device 108, identifying the customer 170, validating authorization, and retrieving the pre-generated digital certificate 152 appropriate for the requesting client device 108 and customer 170, the ONCA 106 selects and retrieves a target digital certificate template 158 for the client device 108 that matches the requested customer 170 and the client device 108 for this request from a certificate template database 114. A certificate template 158 includes information such as certificate lifetime and various certificate attributes and extensions that are required to be present in the customer-specific device certificate 156. The same set of origin digital certificates 152 that are issued by the same OFFCA 104 and have a common profile can be mapped to different certificate templates and different signing keys based on a configuration of the ONCA 106. Or they can be paired with one specific certificate template but with different customer-specific CA signing keys.

Many of such attributes and extensions may already be present in origin digital certificates 152 generated by the OFFCA 104. However, some attributes such as a device ID, chip ID, device serial number, device software (SW) and hardware (HW) version may not have been known ahead of time to the OFFCA 104. In one embodiment, the certificate template 158 indicates which of those attributes need to be added to the origin digital certificate 152 to generate the customer-specific device certificate 156 issued by ONCA 106 and where such attributes fit into the customer-specific device certificate 156.

It is possible for multiple client device 108 models to share the same certificate template 158. The reverse is also true—it is possible for one client device 108 model to support multiple certificate templates 158. In the latter case, a request message sent in step 7 would specify which certificate template 158 is being requested. Optionally, the ONCA 106 may determine which certificate template and which signing key should be applied to the new client device certificate based on information in the request message coming from the device.

Optionally, the certificate template 158 may contain a digital signature from the OFFCA 104 which needs to be verified by the ONCA 106 before the certificate template 158 can be used. This digital signature guards against unauthorized corruption of the certificate templates 158 in the ONCA's certificate template database 114.

In operation twelve, the ONCA 106 accesses a Certificate Authority 164 signing key 162 that the ONCA 106 will use to sign the customer-specific client device digital certificate 156. This CA signing key 162 is typically referenced by the certificate template 158, and is customer-specific. This CA signing key 162 may be stored in a hardware security module (HSM) 160 which is communicatively coupled to a computer or other hardware device of the ONCA 106. In that case, ONCA 106 obtains a handle to the CA signing key 162 inside the HSM 160, and the handle can be later used to sign an customer-specific device certificate 156.

In other cases, the CA signing key 162 may be stored as an encrypted value which is referenced by the certificate template 158. In such an embodiment, the ONCA 106 sends the encrypted CA signing key 162 to the HSM 160, and the HSM 160 "unwraps" (e.g. decrypts) the CA signing key 162 inside the HSM 160. The ONCA 106 then utilizes the CA signing key 162 to sign the customer-specific device certificate 156.

In operation thirteen, the ONCA 106 builds the customer-specific unsigned device digital certificate 155 containing the encrypted device public key and selected other attributes from the pre-generated origin certificate 152 which was retrieved in step ten, the selected target digital certificate template 158, and the customer identifying information. The remaining attributes in the new customer-specific device certificate 156 are determined based on the certificate template 158. Normally, that would include a validity period starting date based on the current date & time and a validity period ending date based on the customer-specific device certificate 156 lifetime determined by the certificate template 158. Other data such as a client device 108 identifier or serial number as well as other client device 108 attributes specified by the certificate template 158 may be added to the customer-specific device certificate 156 during this step.

In step fourteen, the ONCA 106 then signs the new unsigned customer-specific device certificate 155 using the CA signing key 162 obtained in step twelve, which is typically protected inside the HSM 160.

In operation fifteen, the ONCA 106 returns the issued customer specific client device certificate 156 along with the corresponding encrypted device private key 150 (which is copied unchanged from the database or repository 112) to the requesting client device 108 in the response message. In addition to the optional protection provided by a secure session between the ONCA 106 and the requesting client device 108, the encrypted device private key 150 may be further encrypted with a KAEK (Key Agreement Encryption Key). The KAEK is derived from a key agreement protocol such as Diffie-Hellman (DH) or Elliptic Curve Diffie-Hellman (ECDH). The ONCA 106 may also archive the customer-specific device certificate and associate it with the corresponding offline certificate 152. This association may also be reported back to the OFFCA 104 for traceability and reporting.

Optionally in this step, ONCA also returns the pre-generated origin certificate 152 containing the same device public key as the just issued customer-specific device certificate 156.

Figure 2:
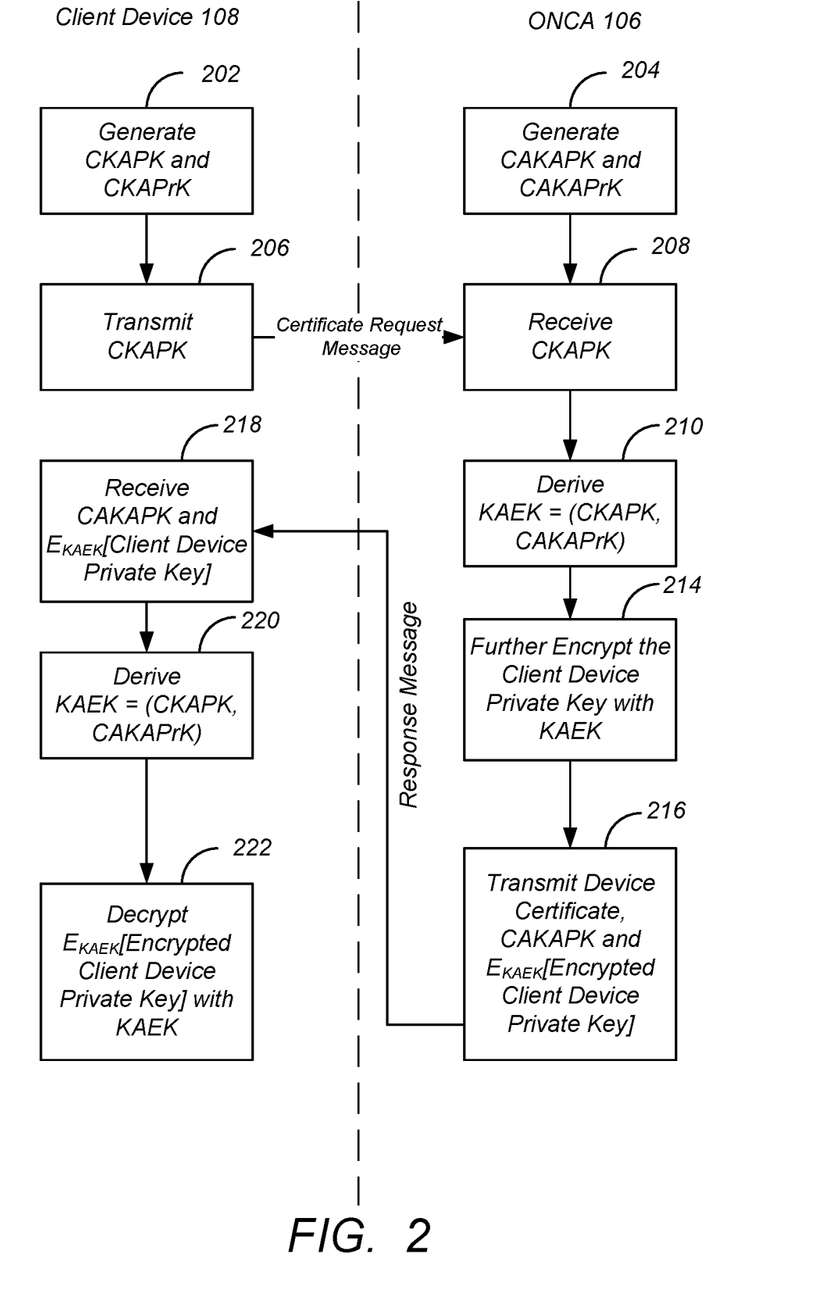
FIG. 2 is a diagram illustrating the derivation and use of a key agreement encryption key.

FIG. 2 is a diagram illustrating the derivation and use of the KAEK. The client device 108 generates a client key agreement public key (CKAPK) and a corresponding client key agreement private key (CKAPrK) as shown in block 202. Similarly, the ONCA 106 generates CA key agreement public key (CAKAPK) and corresponding CA key agreement private key (CAKAPrK), as shown in block 204. In block 206, the client device 108 transmits the CKAPK to the ONCA 106 as a part of the request message, as shown in block 206. The ONCA 106 receives the client key agreement public key CKAPK in block 208, and uses the received client key agreement public key CKAPK to derive the KAEK from the client key agreement public key CKAPK and the CA key agreement private key CAKAPrK, as shown in block 210. This can be accomplished using a variety of methods including:

Diffie-Hellman KAEK=Derive(CKAPK$^{CAKAPrK}$ mod p) and

Elliptic Curve DH KAEK=Derive (CAKAPrK*CKAPK)

where '*' denotes a special elliptic curve multiply operation that is well-known to those skilled in cryptography, and p denotes a prime number. The ONCA 106 then further encrypts the encrypted client device private key with the KAEK to generate the further encrypted client device private key ($E_{KAEK}$[Encrypted Client Device Private Key]), and transmits the client device customer-specific certificate 156 and the further encrypted device private key to the client device 108 in the response message, as shown in blocks 214 and 216. In blocks 218 and 220, the client device 108 receives the response message, and uses the CA key agreement public key CAKAPK and the client key agreement private key CKAPrK to generate the key agreement encryption key KAEK. Then, in block 222, the client device 108 decrypts the further encrypted client device private key using the generated key agreement encryption key KAEK to produce the encrypted client device private key.

Now returning to FIG. 1, in operation sixteen the client device 108 optionally verifies that a received customer-specific device certificate 156 is valid and has a valid CA signature (using the CA signing key 162), then decrypts one or more layers of encryption from the device private key 150. For example, two layers of encryption may be inner-layer encryption with PrKEK (that was originally added by OFFCA 104) followed by outer-layer encryption with KAEK described in the previous operation. All such encryption layers are removed (the outer layer encryption with KAEK removed as shown in block 222 of FIG. 2), after which the client device 108 verifies that the fully decrypted device private key 150 corresponds to the customer-specific device certificate 156 and the device private key contained therein.

Alternatively, the proxy agent 110 can perform the above verification and decryption steps and then can forward the customer-specific device certificate 156 and device private key 150 to the target client device 108 over a separate connection.

Once the client device 108 possesses a fully decrypted and verified customer-specific device certificate 156 and device private key 150, the customer-specific device certificate 156 and device private key 150 are installed locally on the target client device 108. Additional protection (for example, protection local to the client device 108) may be added such as encryption or hardware-based protection by use of a secure memory or a secure CPU in the client device 108.

Alternatively, the inner-layer encryption with PrKEK that was originally added to the device private key 150 by OFFCA 104 may remain and the device private key 150 encrypted with PrKEK may be stored in that manner persistently in the target client device 108. In such an embodiment, the target client device 108 removes the encryption with PrKEK from the device private key 150 each time that it is utilized internally within the client device 108 to perform a crypto operation such as decryption or digital signature.

The pre-generated origin certificate 152 may also be transmitted by the ONCA 106 to the client device 108 in the previous operation. In this case, the origin digital certificate 152 may be persistently saved in the client device 108 along with the customer-specific device certificate 156 and the encrypted device private key 150. The origin digital certificate 152 may have a longer lifetime than the matching customer-specific device certificate 156 derived from the origin digital certificate 152 and may be utilized in the future to request other or additional device certificates 156.

As shown in operation seventeen, customer-specific device certificates 156 that had been generated by ONCA 106 can be optionally copied back to the central PKI repository 112 for archival and for subsequent queries and reports.

In operation eighteen, an authorized administrator using a key generation facility administrative processor (for example, an individual working for a network operator which had deployed the client devices 108) may want to run some queries or reports on the device certificates that had been installed on client devices 108 in their network. The queries may count numbers of client devices 108 of various models that had been provisioned with client device customer-specific certificates 156, run reports for specific time periods, for specific factory locations (if certificate provisioning took place in a factory), etc.

In operation nineteen, a report may be optionally generated based on the contents of the central PKI repository 112 and returned back to the requesting administrator.

If a client device 108 makes a subsequent request with the same information (e.g. same Customer ID), the same customer-specific device certificate may be retrieved and returned as-is, instead of generating a new device certificate. The need for such a returned certificate may arise if the customer-specific device certificate or the private key becomes corrupted within the client device 108. Alternatively, the OFFCA 104 may simply issue a newly generated customer-specific device certificate each time a client device 108 requests.

Hardware Environment

Figure 3:
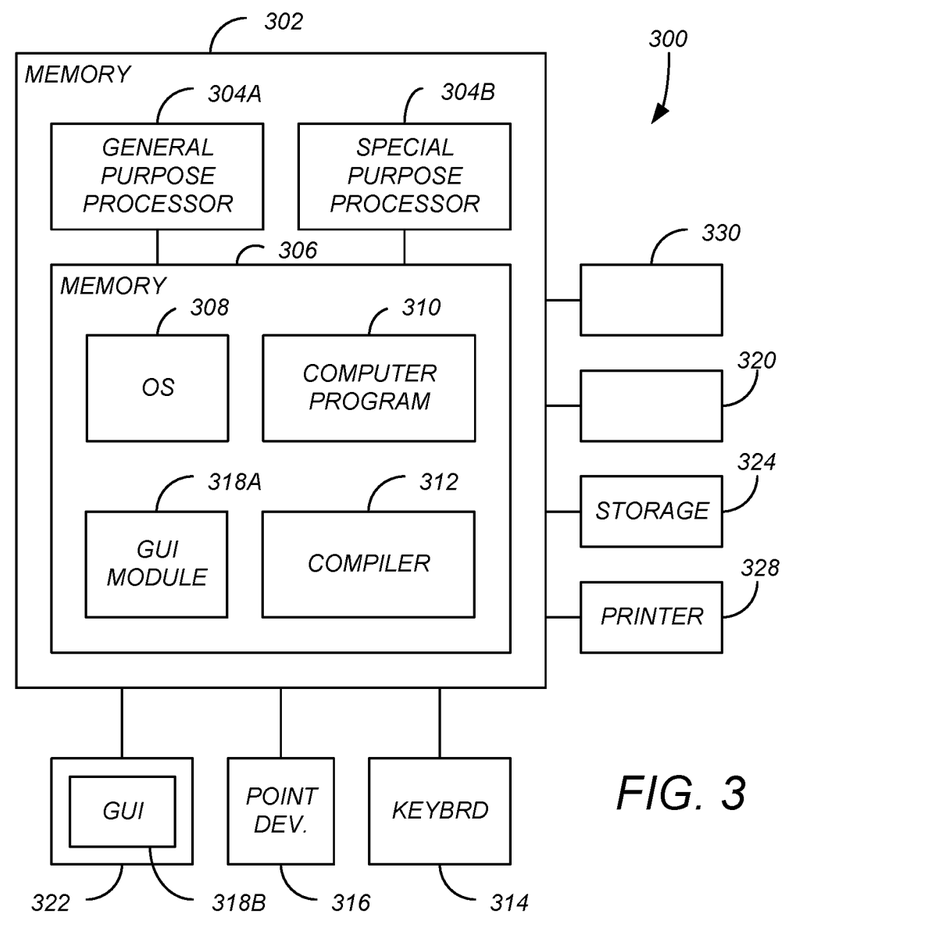
FIG. 3 illustrates an exemplary computer system that could be used to implement processing elements of the geolocation system.

FIG. 3 illustrates an exemplary computer system 300 that could be used to implement processing elements of the above disclosure, including one or more of the OFFCA 104, the central PKI repository 112, the computer 168, the ONCA 106, proxy agent 110 and client device 108. The computer 302 comprises a processor 304 and a memory, such as random access memory (RAM) 306. The computer 302 is operatively coupled to a display 322, which presents images such as windows to the user on a graphical user interface 318B. The computer 302 may be coupled to other devices, such as a keyboard 314, a mouse device 316, a printer 328, etc. Of course, those skilled in the art will recognize that any combination of the above components, or any number of different components, peripherals, and other devices, may be used with the computer 302.

Generally, the computer 302 operates under control of an operating system 308 stored in the memory 306, and interfaces with the user to accept inputs and commands and to present results through a graphical user interface (GUI) module 318A. Although the GUI module 318B is depicted as a separate module, the instructions performing the GUI functions can be resident or distributed in the operating system 308, the computer program 310, or implemented with special purpose memory and processors. The computer 302 also implements a compiler 312 which allows an application program 310 written in a programming language such as COBOL, C++, FORTRAN, or other language to be translated into processor 304 readable code. After completion, the application 310 accesses and manipulates data stored in the memory 306 of the computer 302 using the relationships and logic that was generated using the compiler 312. The computer 302 also optionally comprises an external communication device such as a modem, satellite link, Ethernet card, or other device for communicating with other computers.

In one embodiment, instructions implementing the operating system 308, the computer program 310, and the compiler 312 are tangibly embodied in a computer-readable medium, e.g., data storage device 320, which could include one or more fixed or removable data storage devices, such as a zip drive, floppy disc drive 324, hard drive, CD-ROM drive, tape drive, etc. Further, the operating system 308 and the computer program 310 are comprised of instructions which, when read and executed by the computer 302, causes the computer 302 to perform the operations herein described. Computer program 310 and/or operating instructions may also be tangibly embodied in memory 306 and/or data communications devices 330, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of providing a customer-specific digital certificate to a client device of a plurality of client devices, the method comprising:
receiving, in an online certificate authority, a pre-generated digital certificate and an encrypted client device private key encrypted according to a private key encryption key PrKEK;
receiving, from the client device, a request for the customer-specific digital certificate, the request comprising at least one of client device identifying information and information identifying the customer, the request signed according to a pre-provisioned client device digital certificate;
building the customer-specific digital certificate from the pre-generated digital certificate, a selected target digital certificate template, the client device identifying information, and the customer identifying information, comprising:
identifying the client device from the client device identifying information;
identifying the customer;
retrieving the pre-generated digital certificate;
selecting the target digital certificate template for the client device based at least in part upon the information identifying the customer, the target digital certificate template having attributes that vary according to the customer;
generating the customer-specific digital certificate according to the retrieved pre-generated digital certificate, the target digital certificate template and the client device identifying information;
accessing a customer-specific digital certificate signing key from a certificate authority associated with the identified customer;
re-signing the customer specific digital certificate with the customer specific digital certificate signing key; and
transmitting the customer-specific digital certificate and the encrypted client device private key to the client device; wherein
the customer-specific digital certificate is the pre-generated digital certificate uniquely associated with the client device identifying information; and
the pre-generated digital certificate is one of a batch of pre-generated digital certificates for a group of the plurality of client devices of which the client device is a member, and is provided to an online certificate authority before receiving the request for the customer-specific digital certificate.

2. The method of claim 1, wherein:
the pre-provisioned client device digital certificate is a global digital certificate; and
the client device identifying information is explicitly provided in the request for the customer-specific digital certificate.

3. The method of claim 1, wherein:
the pre-provisioned client device digital certificate is unique to the client device; and
the client device identifying information is determined from the pre-provisioned client device digital certificate.

4. The method of claim 1, wherein:
the system comprises a plurality of customers providing services to the plurality of client devices; and
the private key encryption key PrKEK is a common encryption key shared among all devices for all customers.

5. The method of claim 1, wherein:
the system comprises a plurality of customers providing services to the plurality of client devices, and the private key encryption key PrKEK is different for each of the plurality of customers.

6. The method of claim 5, wherein:
the private key encryption key PrKEK is different for each of the plurality of client devices.

7. The method of claim 1, wherein the client device identifying information is a MAC address of the client device.

8. The method of claim 7, wherein the information identifying the customer includes one or more of:
a customer identifier;
a device credential profile identifier of the client device; and
a MAC address of the client device.

9. The method of claim 1, wherein:
identifying the client device from the client device identifying information comprises:
extracting the client device identifying information from the pre-provisioned client device digital certificate; and
identifying the customer comprises:
identifying the customer according to a comparison between the client device identifying information and a pre-determined mapping of the client device identifying information and the customer provided to an online certificate authority.

10. The method of claim 1, wherein:
identifying the client device from the client device identifying information comprises:
extracting the client device identifying information from the request for the customer-specific digital certificate; and
identifying the customer comprises:
extract the customer identifying information from the request.

11. The method of claim 1, wherein:
the client device pre-provisioned digital certificate comprises a MAC address of the client device; and
the customer is identified according to a comparison of the MAC address of the client device and whitelist of MAC addresses for each of the plurality of customers.

12. The method of claim 1, wherein each pre-provisioned client device digital certificate is pre-installed in the associated client device at a factory producing the client device.

13. In a system comprising a plurality of customers providing services to a plurality of client devices, an apparatus for providing an customer-specific digital certificate to a client device of the plurality of client devices, comprising:
a processor;
a memory, communicatively coupled to the processor, the memory storing processor instructions comprising processor instructions for:
receiving, in an on line certificate authority, a pre-generated digital certificate and an encrypted client device private key encrypted according to a private key encryption key PrKEK;
receiving, from the client device, a request for the customer-specific digital certificate, the request comprising at least one of client device identifying information and information identifying the customer, the request signed according to a pre-provisioned client device digital certificate; and
building the customer-specific digital certificate from the pre-generated digital certificate, a selected target digital certificate template, the client device identifying information, and the customer identifying information, comprising:
identifying the client device from the client device identifying information;
identifying the customer;
retrieving the pre-generated digital certificate;
selecting the target digital certificate template for the client device based at least in part upon the information identifying the customer, the target digital certificate template having attributes that vary according to the customer;
generating the customer specific digital certificate according to the retrieved pre-generated digital certificate, the target digital certificate template and the client device identifying information;
accessing an customer-specific digital certificate signing key from a certificate authority associated with the identified customer;
re-signing the customer specific digital certificate with the customer specific digital certificate signing key; and
transmitting the customer-specific digital certificate and the encrypted client device private key to the client device; wherein
the customer-specific digital certificate is the pre-generated digital certificate uniquely associated with the client device identifying information; and
the pre-generated digital certificate is one of a batch of pre-generated digital certificates for a group of the plurality of client devices of which the client device is a member, and is provided to an online certificate authority before receiving the request for the customer-specific digital certificate.

14. The apparatus of claim 13, wherein:
the pre-provisioned client device digital certificate is a global digital certificate; and
the client device identifying information is explicitly provided in the request for the customer-specific digital certificate.

15. The apparatus of claim 13, wherein:
the pre-provisioned client device digital certificate is unique to the client device; and
the client device identifying information is determined from the pre-provisioned client device digital certificate.

16. The apparatus of claim 13, wherein:
the system comprises a plurality of customers providing services to the plurality of client devices; and
the private key encryption key PrKEK is a common encryption key shared among all devices for all customers.

17. The apparatus of claim 13, wherein:
the system comprises a plurality of customers providing services to the plurality of client devices, and the private key encryption key PrKEK is different for each of the plurality of customers.

* * * * *